United States Patent [19]

Pistoia

[11] Patent Number: 5,039,582
[45] Date of Patent: Aug. 13, 1991

[54] HIGH ENERGY AND HIGH POWER LITHIUM STORAGE BATTERIES, AND METHOD FOR PRODUCING THE SAME

[75] Inventor: Gianfranco Pistoia, Rome, Italy

[73] Assignee: Consiglio Nazionale Delle Ricerche, Rome, Italy

[21] Appl. No.: 507,788

[22] Filed: Apr. 12, 1990

[30] Foreign Application Priority Data

Apr. 12, 1989 [IT] Italy ................... 47840 A/89

[51] Int. Cl.$^5$ ............................................. H01M 4/48
[52] U.S. Cl. ......................................... 429/218; 423/65
[58] Field of Search ................ 429/194, 192, 218; 423/65

[56] References Cited

U.S. PATENT DOCUMENTS 3,712,942  1/1973  Svejda ................................ 423/65
4,596,752  6/1986  Faul ............................... 429/199 X

OTHER PUBLICATIONS

Pistola et al., "Li/Li$_{1+x}$V$_3$O$_8$ Secondary Batteries", Journal of the Electrochemical Society, vol. 132, p. 281; 2/85.

Bonino et al., "A Polymeric Electrolyte Rechargeable Lithium Battery", Journal of the Electrochemical Society, vol. 135, p. 12; 1/88.

Primary Examiner—Stephen J. Kalafut
Attorney, Agent, or Firm—Pollock, Vande Sande & Priddy

[57] ABSTRACT

High energy and high power lithium storage batteries, comprising and anode of lithium or lithium alloy, a non-aqueous electrolytic solution containing a lithium salt in one or more organic solvents or a solid electrolyte consisting of a lithium salt/polymeric material complex, and a cathode based on a lithium-vanadium oxide of nominal stoichiometric formula LiV$_3$O$_8$, which is obtained in the amorphous form by means of a new process of synthesis in aqueous solution. The choice of the amorphous form for the cathode material provides better performance with respect to the corresponding material in the crystalline form.

17 Claims, 3 Drawing Sheets

HIGH ENERGY AND HIGH POWER LITHIUM STORAGE BATTERIES, AND METHOD FOR PRODUCING THE SAME The present invention relates to high energy and high power lithium batteries as well as to the method for producing the same. More particularly, this invention relates to a lithium secondary cell employing as the cathodic material a lithium-vanadium oxide of such morphology as to show improved properties with respect to the already known materials; the cathodic material is obtained through a specifically conceived procedure.

Lithium anode rechargeable batteries have been available on the market for some years. The batteries based on the $Li/MoS_2$ pair, produced by Moli Energy (Canada), are the first developed. They are capable of resisting several hundreds of charge/discharge cycles, but their theoretical specific energy (233 Wh/kg, corresponding to 0.8 $Li^+$/molecule) is not enough for a number of applications.

In recent times, the commercial availability has been announced of storage batteries working on other systems, in particular on $Li/NbSe_3$ and on $Li/MnO_2$. The theoretical specific energy values of the above-mentioned systems, however, are not particularly high (436 Wh/kg for the first couple, and 415 Wh/kg for the second one).

As is well known in the field, in order to work satisfactorily as a cathode, a material must be such as to supply a high specific capacity and a high energy density, both of which are requisites of fundamental importance. It is also known that other properties are equally important, i.e. a good chemical and electrochemical stability against the organic solutions employed for the electrolyte, as well as the capability of resisting high current levels and long cycling operations, and of enduring overcharging and over discharging. Moreover, said material should also be of limited cost and non toxic.

Keeping into account all such requisites, the author of the present invention has already determined a particularly promising cathode material, i.e. a lithium-vanadium oxide of formula $Li_{1+x}V_3O_8$ in crystalline form (monoclinic system), which is the subject-matter of the Italian patent No. 1,148,606.

With the purpose of improving the performance of the lithium-vanadium oxide based cathode, the possibility has been investigated thereafter of modifying the crystalline structure of $LiV_3O_8$ in order to make $Li^+$ ion intercalation easier. It has been found that a positive result could be obtained by applying measures capable of giving rise to an increase in the interlayer distance in the crystalline structure. Particularly effective were the substitution of a part of the $Li^+$ ions of the compound by $Na^+$ ions (cathode materials of the formula $Li_{1+x-y}Na_yV_3O_8$) and the intercalation of water molecules into the crystalline lattice. All the above is the subject-matter of the Italian patent application no. 48218 A/88.

Both $Li_{1+x}V_3O_8$ and $Li_{1+x-y}Na_yV_3O_8$ are obtained by high temperature melting (at least 600° C.) of $V_2O_5$ with $Li_2CO_3$, or with $Li_2CO_3$ and $Na_2CO_3$ in the suitable proportions. The melt, once cooled, gives rise to a very solid material which is then to be crushed and milled in order to obtain the cathode material. The process according to the above-mentioned patent application provides, as already pointed out, a cathode material with improved properties with respect to those of the original $LiV_3O_8$, and comprises, in addition to the above-mentioned procedures, a pressing operation performed at a high pressure. The pressing gives rise to the formation of particles having grain size much smaller than those usually employed.

According to the process of the above-mentioned patent application, in order to obtain a satisfactory mixing with the conductive and binding additives normally used in the cathode mixture, the crystalline oxide in the form of a very fine powder, is suspended together with the additives in methanol and subjected to high speed stirring. Then the methanol is evaporated off and the resulting solid material is milled under dry conditions. After pressing the powder on a nickel grid, the cathode is preferably subjected to sintering.

It can be clearly seen from the above that the appreciable improvement in the properties of the above-mentioned cathode material with respect to the lithium-vanadium oxide of the original patent is counterbalanced by a certain complexity of the production process.

Accordingly, the object of the present invention consists in providing a cathode material of the same kind as those disclosed above, with improved properties as regards its performance in the storage battery, and which is also obtainable by means of a simple and economic process.

Since it has been observed in the previous investigations that a cathode material with particles of the order of some microns shows surely better performance than a material with 20–30 μm granulometry, the synthesis has been considered of a compound having the same chemical formula as the preceding materials but with a still more favorable morphology.

This can be obtained if the lithium-vanadium oxide is in the amorphous form instead of being in the crystalline form, and such amorphous form can be obtained through a specifically devised process, which has in addition the advantage of being extremely simple when compared to the synthesis performed by high temperature melting.

It is to be observed that the technical literature in the field reports the possibility of preparing a form of $LiV_3O_8$ which contains a remarkable percentage of the amorphous compound, and this possibility has been studied by the author of the present invention. The process in question consists in cooling the melt $LiV_3O_8$ suddenly after bringing the same to 800°–900° C. The material thereby obtained, which is already partially crystalline, loses a remarkable part of its amorphous character when it is finely milled to ensure acceptable electrochemical performance. The need for a high temperature synthesis, as well as for a rapid cooling technique (which usually involves the use of rollers) and for methods capable of giving a finely milled product make the whole process quite complicated. Moreover, the final product, as already remarked above, is again largely crystalline. In view of the foregoing, the said process is not preferable to the process disclosed in the present invention.

According to the present invention, it is suggested to produce $LiV_3O_8$ in its amorphous form by synthesis in water solution, by reaction between lithium hydroxide, LiOH, and vanadium pentoxide, $V_2O_5$, in the suitable proportions. The reaction, which can be carried out also at room temperature, gives rise to a precipitate of very fine LiV$_3$O$_8$ particles, which showed completely amorphous on X-ray examination In order to ascertain that the compound was actually LiV$_3$O$_8$, the same was heated up to 350° C. At that temperature the compound becomes crystalline and accordingly its structure can be compared to that of LiV$_3$O$_8$ synthesized at high temperature. The two compounds were shown to be the same on X-ray analysis.

Accordingly, the present invention specifically provides a high energy, high power lithium storage battery comprising a lithium anode or an anode of a lithium alloy with one or more metals, a nonaqueous electrolytic solution containing a lithium salt in one or more organic solvents, or a solid electrolyte made of a lithium salt/polymeric material complex, and a cathode based on a lithium-vanadium oxide of nominal stoichiometric formula LiV$_3$O$_8$, which is characterized in that said oxide is completely amorphous.

As already mentioned above, the amorphous oxide can be obtained from the following reaction carried out in water solution:

$$2LiOH + 3V_2O_5 \rightarrow 2LiV_3O_8 + H_2O$$

in which the two reactants are to be employed in the LiOH/V$_2$O$_5$ molar ratio of 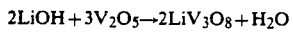.

Such reaction is carried out with stirring at room temperature or, if desired, by moderate heating.

As it is well known, the cathode contains conducting additives such as graphite, acetylene black and carbon, and binding additives, such as Teflon, polyethylene and polypropylene. Due to the extreme fineness of the amorphous oxide particles of the present invention, it may be advantageous to employ the wet mixing technique already disclosed in the above-referred previous patent application, as it will be illustrated in a detailed way below.

The metal alloyed with lithium can be selected from aluminum, cadmium, tin, bismuth, chromium, manganese and lead, while the lithium salt in the electrolytic solution or in the solid electrolyte can be LiClO$_4$, LiAsF$_6$, LiBF$_4$ or LiCF$_3$SO$_3$.

The organic solvents to be employed in the storage battery of the present invention are preferably propylene carbonate, ethylene carbonate, dimethoxyethane, methylformate, tetrahydrofuran, 2-methyltetrahydrofuran, sulfolane and mixtures thereof.

Polyethylene oxide, polypropylene oxide and mixtures thereof are preferred as polymeric materials for the solid electrolyte.

The production process, which is further provided by the present invention, comprises, as initial steps, the operation of dissolving the predetermined amount of powder LiOH in water and of adding V$_2$O$_5$ progressively till a molar ratio of LiOH/V$_2$O$_5$ of about ⅔ is reached, while keeping the whole mixture stirred. The operation is carried out at room temperature, or at a relatively higher temperature if a faster reaction is desired.

It is important that the addition of vanadium pentoxide be completed up to the predetermined molar ratio, as the reaction develops through the formation of intermediate products (Li$_3$VO$_4 \rightarrow$ LiVO$_3 \rightarrow$ LiV$_3$O$_8$) which disappear when the correct ratio has been reached.

After keeping the reaction mixture stirred for a period of time between 24 and 40 hours, preferably for about 24 hours, LiV$_3$O$_8$ can be separated in the form of a very fine precipitate. According to the process of the present invention, the product is preferably washed with water once or twice; owing to the slow sedimentation rate, it is convenient to separate the precipitate by centrifugation.

Then the product is dried in oven at 100°–200° C., so that a fine powder of amorphous LiV$_3$O$_8$ is obtained.

Thereafter, according to the process of the present invention, LiV$_3$O$_8$ is mixed with the conductive and binding additives (in particular acetylene black and Teflon in the weight ratio to one another of 2/1 and in such amount as to form a weight proportion amount of 20–30% of the whole cathode mixture), by employing the following wet mixing technique: the components are dispersed in a liquid in which they are insoluble, preferably in methanol, then they are mixed by high-speed stirring and thereafter the solvent is evaporated off. The resulting solid, which is made of a very homogeneous mixture of the cathode components, is milled.

The resulting powder is then made compact by pressing it on a nickel grid. It has been also found that it is particularly advantageous to perform a final re-drying treatment of the cathode tablet, preferably at 100°–260° C., more preferably at about 200° C.

The cathode so obtained, inserted into a battery having a lithium anode and a non-aqueous electrolyte, has shown a clearly better performance than that of the crystalline material, both in single discharge operation and in prolonged cycling.

The results of some experiments carried out with a storage battery manufactured according to the preferred solutions mentioned above, together with their interpretation on a theoretical base, are shown in the diagrams of the enclosed drawings, in which.

The storage battery according to the present invention to which the following examples refer has a lithium anode supported on Ni, an electrolytic solution consisting of LiClO$_4$ in propylene carbonatedimethoxyethane and a cathode based on amorphous LiV$_3$O$_8$, obtained according to the preferred solutions of the above-disclosed process, with the addition of acetylene black/Teflon in the relative ratio of 2/1 and in a total amount of 30% by weight.

The performance of such battery is compared to that of a similar battery having a cathode based on a crystalline LiV$_3$O$_8$.

Figure 1:
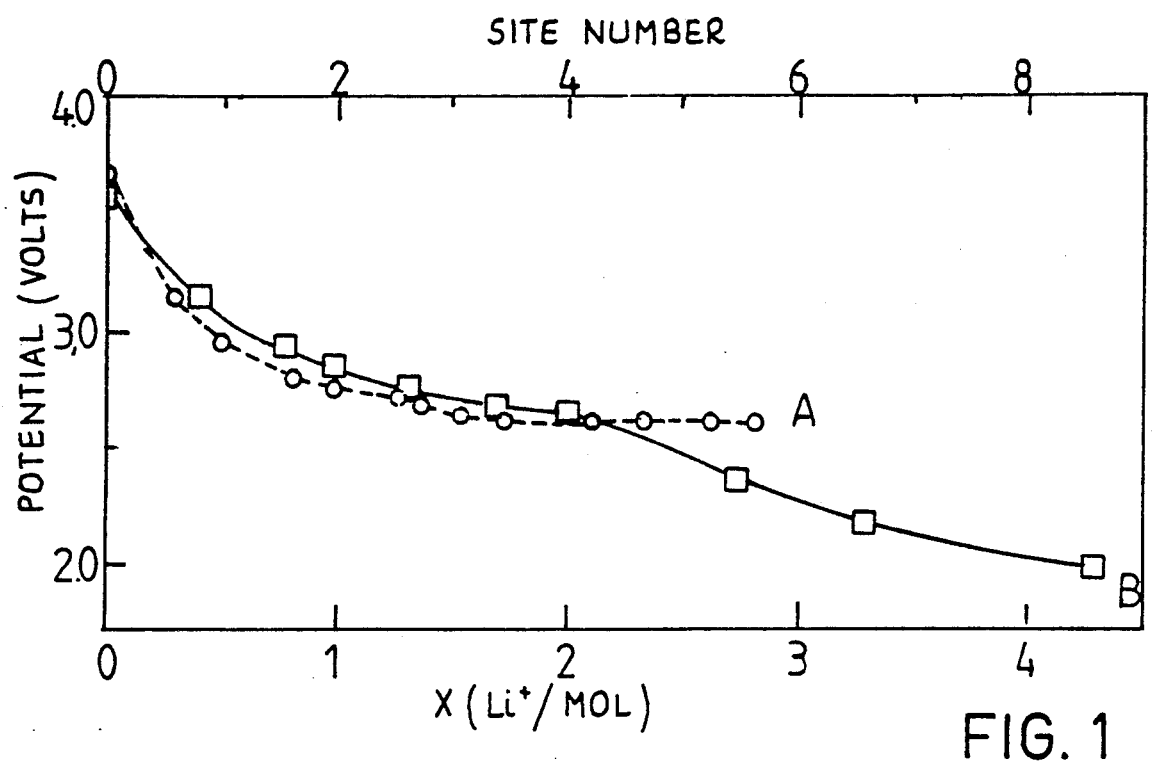
FIG. 1 shows the open-circuit voltage of the cells as a function of the amount of lithium ions inserted into the microstructure during discharge.

From the curves of FIG. 1 (A for the crystalline oxide and B for the amorphous oxide) it can be observed that the amorphous material allows a higher battery capacity to be obtained. Indeed, in the case of the amorphous material, the value of x in Li$_{1+x}$V$_3$O$_8$ during discharge (Li$^+$ ions being intercalated) can attain a maximum value of about 4.3, whereas for the crystalline oxide the maximum value is slightly less than 3. This means that the amorphous oxide is capable of intercalating a larger amount of Li$^+$ ions in its unit cell. Actually, the long-range crystallographic order is absent in an amorphous compound, while the short-range order is preserved.

In the amorphous compound, which is endowed with a higher flexibility because of the absence of a long-range order, the unit cell can be modified upon the intercalation of Li+ ions. This plasticity causes further sites to be created inside the unit cell, in which sites said Li+ ions can reside: the number of sites that can be occupied ranges from a maximum value of about 6 in the crystalline compound to a maximum of about 9 in the amorphous compound. With an x value of 4.3 and with an average voltage of 2.58 V, both of which being obtainable from FIG. 1 for the amorphous material, it is possible to obtain specific capacity and specific energy values respectively, of 400 Ah/kg and 1,032 Wh/kg. The latter value, if the amount of intercalated lithium is also accounted for (4.3 Li+/molecule) gives rise to a value of 935 Wh/kg for the Li/LiV$_3$O$_8$ pair. Such specific energy is higher than those of the already mentioned materials MoS$_2$, NbSe$_3$ and MnO$_2$, and it is also higher than those of other known cathodes such as TiS$_2$, V$_6$O$_{13}$, Li$_x$CoO$_2$ and V$_2$O$_5$. It is to be observed that the intercalation of Li+ in the amorphous compound is largely reversible, i.e. almost all lithium intercalated during discharge can be disintercalated in the battery charge.

To such considerations concerning the microstructure of the amorphous material, other considerations are also to be added concerning the macrostructure, which is characterized by the extreme fineness of the particles. Electronic microscope analysis has shown the presence of soft particles of 1 micron size or less, which show a tendency to form incoherent clusters that are easily crushed during the formation of the cathodic mixture. The fineness of the particles is indeed fundamental for a good performance of the cathode itself, above all under severe conditions of charge/discharge.

More particularly, the following advantages can be obtained:

no breaking of the large particles occurs following to the intercalation/disintercalation cycles, so that no contact losses occur;

a better contact is obtained between the active material and the conductive additive, so that it is possible to apply very high currents;

the electrolyte can reach into the innermost layers of the cathode so reducing polarization phenomena.

Figure 2:
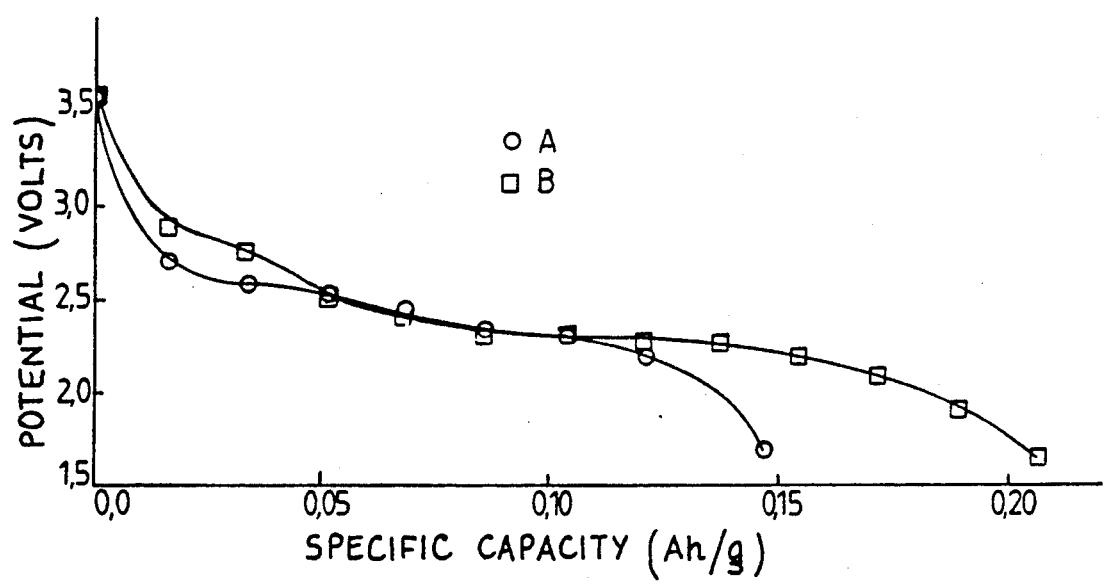
FIG. 2 shows the voltage specific capacity curves during discharge.

Such advantages can be put into evidence both in discharge operations and in cycling at high current values. For example, in FIG. 2 the voltage vs. capacity curves are compared for a storage battery with a crystalline oxide (curve A) and for that of the present invention (curve B) under discharge conditions of 1.5 C (where C is the capacity of the battery), at the tenth discharge cycle. The discharge condition of 1.5 C corresponds to a current of 3.2 mA/cm$^2$, whereas the charge current was 2.1 mA/cm$^2$. The storage battery with the amorphous oxide can supply, at a higher voltage, a higher capacity (0.207 Ah/g as opposed to 0.146 Ah/g, down to 1.7 V).

If, in addition, the cycling is considered in its full development, it is also more evident that the amorphous material is superior, as can be seen in the following examples.

EXAMPLE 1

Figure 3:
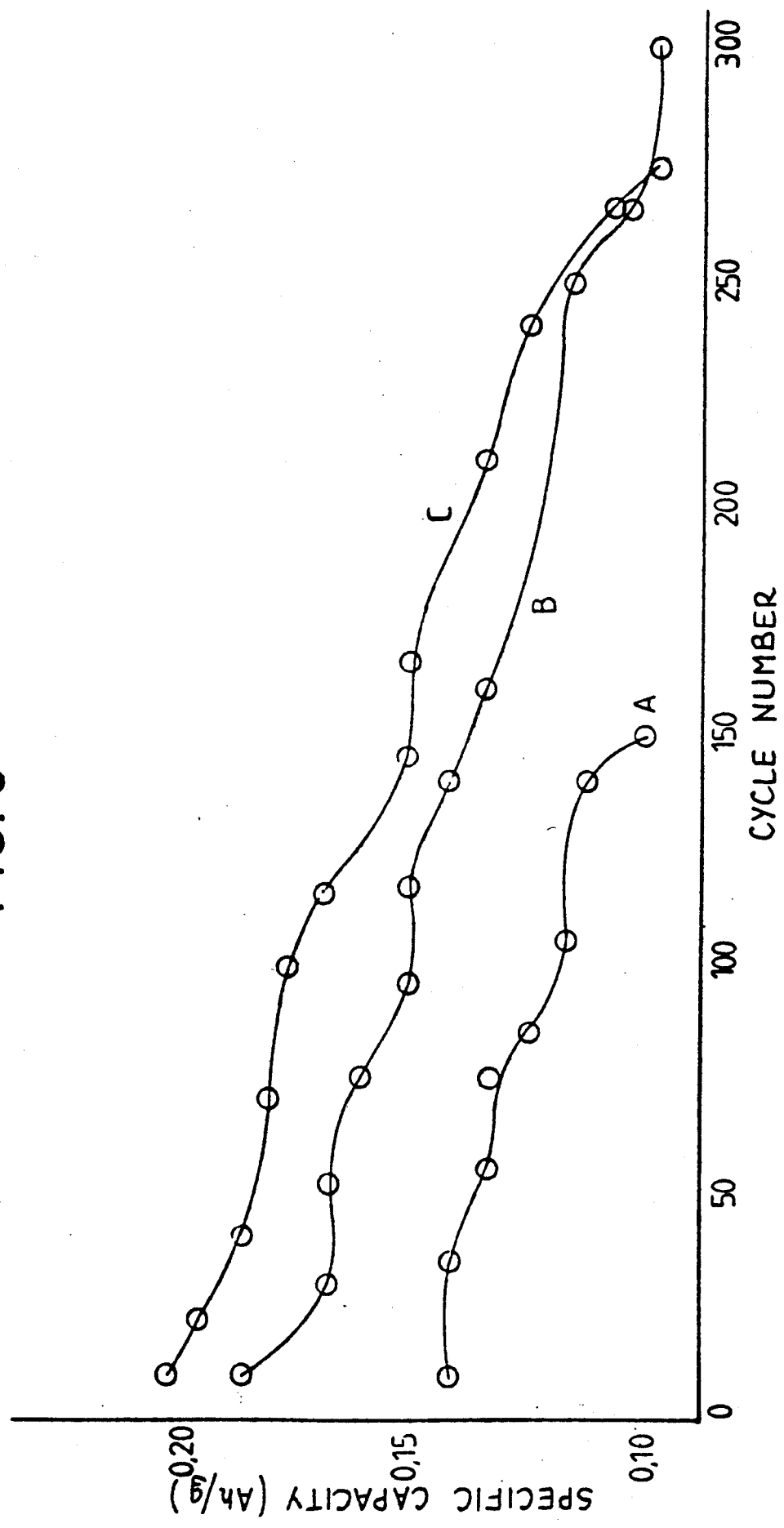
FIG. 3 shows the behavior of the specific capacity at an increasing number of charge and discharge cycles.

Two cells (B and C) of the button type comprising a Li disc as the anode, an electrolytic solution consisting of LiClO$_4$ in propylene carbonate-dimethoxyethane, a cathode obtained by pressing under 10 t/cm$^2$ a mixture of amorphous LiV$_3$O$_8$ and acetylene black/Teflon (70/30) were subjected to cycles at 1.5C on discharge and at 1 C on charge. The two cells differed from each other only for the temperature of the final heat treatment, to which the cathode had been subjected, which temperature was of 100° C. for cell B, and of 200° C. for cell C. A similar cell (A), which contained however a cathode based on a crystalline material, was also tested in a parallel way. In FIG. 3, the curves A, B and C refer to the corresponding cells.

As it can be observed, the storage batteries of the present invention withstand a higher number of cycles and have higher capacities with respect to the crystalline compound. Moreover, it can be remarked that the cathode which has undergone a re-drying at 200° C. shows a better behavior than the one re-dried at 100° C., such behavior is attributed supposedly to a more complete removal of the water incorporated in the oxide during the synthesis in aqueous solution. Additionally, also a normal heat treatment at 100° C. gives a cathode of performance remarkably better than a cathode based on a crystalline oxide.

EXAMPLE 2

Figure 4:
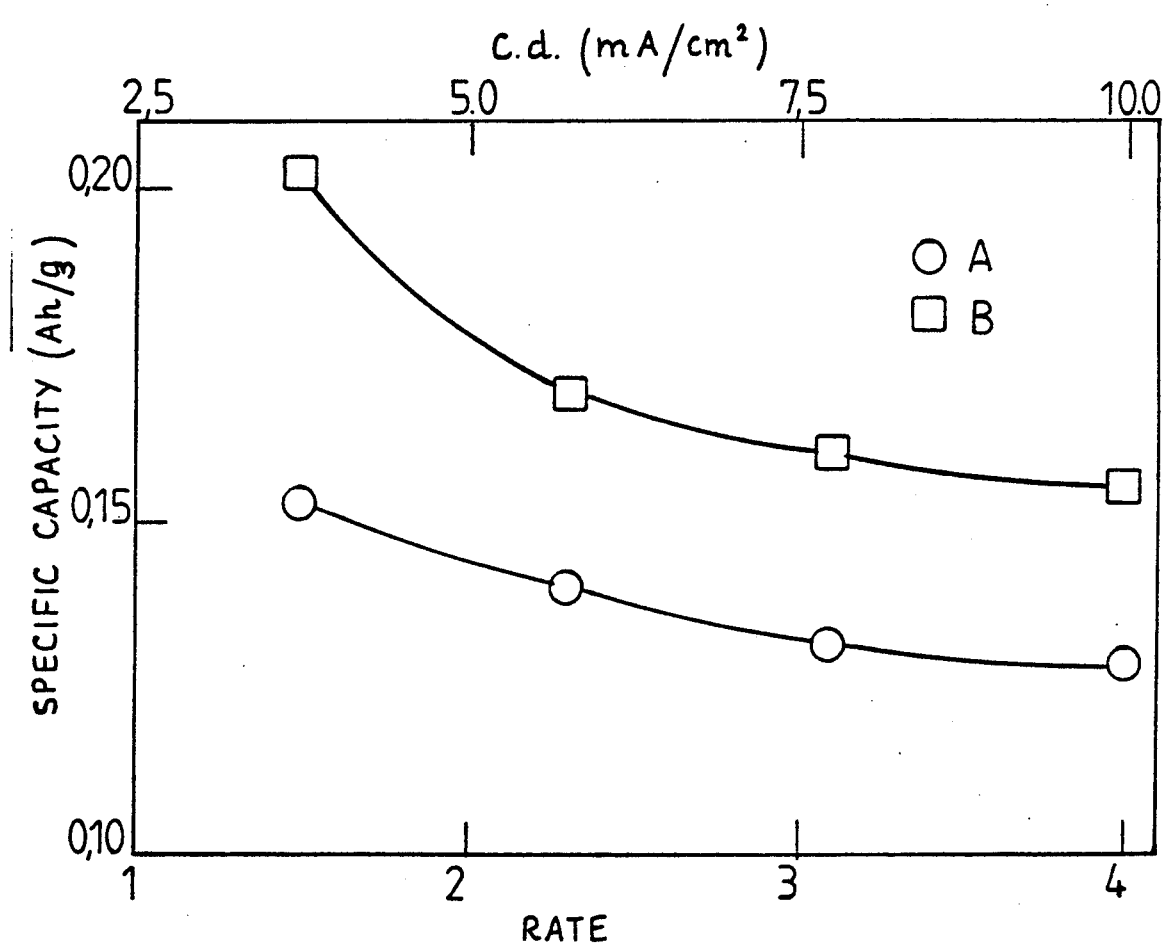
FIG. 4 shows the specific capacity as a function of the discharge conditions.

Two cells produced according to example 1, one of them containing the cathode based on the amorphous material, re-dried at 200° C., and the other containing the crystalline material, were subjected to cycling under severe conditions (from 1.5 C to 4 C on discharge, while the charge was always at C). FIG. 4 shows clearly that the amorphous material (curve B) gives rise to specific capacities remarkably superior to those of the crystalline compound (curve A) under all conditions.

The present invention has been disclosed with particular reference to some preferred embodiments thereof, but it is to be understood that modifications and changes can be brought to it without departing from its true spirit and scope.

I claim:

1. A high energy, high power lithium storage battery comprising an anode of lithium or of a lithium alloy with one or more metals, a nonaqueous electrolytic solution containing a lithium salt in one or more organic solvents, or a solid electrolyte consisting of a lithium salt/polymeric material complex, and a cathode based on a lithium-vanadium oxide corresponding to the nominal stoichiometric formula LiV$_3$O$_8$, characterized in that said oxide is completely amorphous.

2. A storage battery according to claim 1, wherein the said amorphous oxide is produced by reaction of LiOH with V$_2$O$_5$ in the molar ratio of about ⅔ in aqueous solution.

3. A storage battery according to claim 2, wherein said reaction in aqueous solution is carried out at room temperature.

4. A storage battery according to claim 1 or 2, wherein said cathode also contains a conductive additive.

5. A storage battery according to claim 1 or 2, wherein said cathode also contains a binding additive.

6. A storage battery according claim 1 or 2, wherein said metal alloyed with lithium is selected from the group consisting of aluminum, cadmium, tin, lead, bismuth, chromium and manganese.

7. A storage battery according to claim 1 or 2, wherein the said lithium salt is selected from the group consisting of LiClO$_4$, LiAsF$_6$, LiBF$_4$ and LiCF$_3$SO$_3$.

8. A storage battery according to claim 1 or 2, wherein said one or more organic solvents are selected from the group consisting of: propylene carbonate, ethylene carbonate, dimethoxyethane, methylformate, tetrahydrofuran, 2-methyltetrahydrofuran, sulfolane and mixtures thereof.

9. A storage battery according to claim 1 or 2, wherein said polymeric material in the solid electrolyte is selected from the group consisting of polyethylene oxide, polypropylene oxide and mixtures thereof.

10. A storage battery according to claim 4, wherein said conductive additive is selected from the group consisting of graphite, acetylene black and carbon.

11. A storage battery according to claim 5, wherein said binding additive is selected from the group consisting of Teflon, polyethylene and polypropylene.

12. A process for the production of a lithium storage battery, comprising an anode of lithium or a lithium alloy with one or more metals, a nonaqueous electrolytic solution containing a lithium salt in one or more organic solvents, or a solid electrolyte consisting of a lithium salt/polymeric material complex, and a cathode based on a lithium/vanadium oxide corresponding to the nominal stoichiometric formula $LiV_3O_8$, wherein the preparation of the cathode comprises the following steps:
  a) dissolving powdered LiOH in water;
  b) adding $V_2O_5$ progressively and under stirring up to a molar ratio $LiOH/V_2O_5$ of about $\frac{2}{3}$;
  c) separating, after about 24-40 hours from the start of the reaction, the precipitate so obtained, washing it with water and then separating it from the water;
  d) drying the product of the preceding step so as to obtain a fine $LiV_3O_8$ powder;
  e) mixing said powder oxide with cathodic additives, by dispersing said oxide and additives in a liquid in which they are insoluble, then stirring at high speed and then evaporating the liquid;
  f) milling the solid produce obtained from the preceding step;
  g) pressing said product on a nickel grid; and,
  h) re-drying the cathode tablet by heating.

13. A process according to claim 10, wherein the said separation of the precipitate obtained as the product in step c) is carried out 24 hours after the start of the reaction.

14. A process according to claim 11, wherein said reaction is carried out at room temperature.

15. A process according to claim 10, wherein said drying step d) is carried out in an oven at 100°-200° C.

16. A process according to claim 10 wherein said cathode additives are acetylene black and Teflon in the weight ratio of 2/1 with respect to one another, and they are added in such amount as to form a weight proportion of 20-30% of the cathode mixture.

17. A process according to claim 10, wherein said final re-drying is carried out at a temperature between 100° and 260° C.

* * * * *

UNITED STATES PATENT AND TRADEMARK OFFICE
CERTIFICATE OF CORRECTION

PATENT NO. : 5,039,582

DATED : August 13, 1991

INVENTOR(S) : Gianfranco Pistoia

It is certified that error appears in the above-identified patent and that said Letters Patent is hereby corrected as shown below:

Column 8, line 15, "10" should read -- 12 --;

Column 8, line 19, "11" should read -- 13 --;

Column 8, line 21, "10" should read -- 12 --;

Column 8, line 23, "10" should read -- 12 --;

Column 8, line 28, "10" should read -- 12 --;

Signed and Sealed this

Twenty-sixth Day of January, 1993

*Attest:*

STEPHEN G. KUNIN

*Attesting Officer*    *Acting Commissioner of Patents and Trademarks*